(12) United States Patent
Mostert

(10) Patent No.: US 9,882,957 B1
(45) Date of Patent: Jan. 30, 2018

(54) CLIENT-SIDE ENDPOINT SPECIFICATION IN A NETWORK SERVICE REQUEST

(71) Applicant: Amazon Technologies, Inc., Reno, NV (US)

(72) Inventor: Andre Mostert, Cape Town (ZA)

(73) Assignee: Amazon Technologies, Inc., Seattle, WA (US)

(*) Notice: Subject to any disclaimer, the term of this patent is extended or adjusted under 35 U.S.C. 154(b) by 438 days.

(21) Appl. No.: 13/966,122

(22) Filed: Aug. 13, 2013

(51) Int. Cl.
*H04L 29/06* (2006.01)
*H04L 29/08* (2006.01)
*H04M 7/00* (2006.01)

(52) U.S. Cl.
CPC ............. *H04L 67/02* (2013.01); *H04L 63/08* (2013.01); *G05B 2219/34256* (2013.01); *H04L 67/327* (2013.01); *H04M 7/0012* (2013.01)

(58) Field of Classification Search
CPC ......... H04L 67/02; H04L 63/08; H04L 63/10; H04L 67/327; H04L 67/47; H04L 67/14; H04W 84/20; H04W 28/02; H04W 28/10; G05B 2219/34256; G05B 2219/36037; H04M 1/2473; H04M 7/0012; H04N 21/4431
See application file for complete search history.

(56) References Cited

U.S. PATENT DOCUMENTS

| | | | |
|---|---|---|---|
| 2002/0085719 A1* | 7/2002 | Crosbie | 380/248 |
| 2002/0145980 A1* | 10/2002 | Morley et al. | 370/244 |
| 2002/0165961 A1* | 11/2002 | Everdell | H04L 41/22 709/225 |
| 2004/0143665 A1* | 7/2004 | Mace | H04L 63/029 709/227 |
| 2005/0076106 A1* | 4/2005 | Hummer | H04L 67/42 709/223 |
| 2008/0276064 A1* | 11/2008 | Munshi | G06F 9/5016 711/173 |
| 2009/0125633 A1* | 5/2009 | Watsen | H04L 63/029 709/229 |
| 2010/0074097 A1* | 3/2010 | Jeon | H04W 36/12 370/217 |
| 2010/0251270 A1* | 9/2010 | Dale | G06F 9/5011 719/328 |
| 2010/0312849 A1* | 12/2010 | Miyabayashi et al. | 709/209 |

(Continued)

OTHER PUBLICATIONS

Fielding and Reschke, Hypertext Transfer Protocol (HTTP/1.1): Message Syntax and Routing, Jun. 2014, Internet Engineering Task Force, RFC 7230.*

(Continued)

*Primary Examiner* — Nelson Scott Giddins
(74) *Attorney, Agent, or Firm* — Klarquist Sparkman, LLP

(57) ABSTRACT

Client-side endpoint configuration can be accomplished by allowing a client to include as part of an API request, a desired endpoint for subsequent notifications from a server. The endpoint can be an endpoint identifier, such as a Uniform Resource Identifier (URI) or a domain name. When a web service receives the API request from a client device, the web service can generate a response to the request and send the response to the endpoint identified in the request. The API request can asynchronously communicate with the client device whenever the response is completed.

15 Claims, 9 Drawing Sheets

(56) References Cited

U.S. PATENT DOCUMENTS

| | | | | |
|---|---|---|---|---|
| 2010/0318665 A1* | 12/2010 | Demmer | ................. | H04L 41/12 |
| | | | | 709/227 |
| 2011/0235585 A1* | 9/2011 | Lee | ........................ | H04W 4/12 |
| | | | | 370/328 |
| 2012/0302170 A1* | 11/2012 | Frazier et al. | ................ | 455/41.3 |
| 2014/0281480 A1* | 9/2014 | Petty | ............................. | 713/151 |

OTHER PUBLICATIONS

"Amazon Glacier," http://aws.amazon.com/glacier, downloaded on Aug. 13, 2013, 4 pages.

* cited by examiner

CLIENT-SIDE ENDPOINT SPECIFICATION IN A NETWORK SERVICE REQUEST

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Web services are often associated with cloud computing. A web service is a software function provided at a network address over the web or the cloud. Clients initiate requests to servers; servers process requests and return appropriate responses. The client requests are typically initiated using an API request. An API is a programmatic interface to a defined request-response message system, typically expressed in JSON or XML, which is exposed via the web—most commonly by means of an HTTP-based web server. The API can specify a set of functions or routines that accomplish a specific task or allow interaction with a software component.

Communications between client and servers is accomplished using well-established protocols, such as the Transmission Control Protocol (TCP). TCP provides for reliable delivery of packets streams using a system of sequential acknowledgement and retransmission when necessary. TCP is a connection-oriented protocol in which two devices exchange messages to open a virtual connection via the network. Once a connection is opened, bidirectional communications may occur between the connected devices. The connection may exist until closed by one of the devices. Opening and closing a connection both require several steps for which specific messages are exchanged between the two devices. A connection may also be closed when an anticipated response is not received by one device for a predetermined period of time, commonly called a "time-out". A TCP connection is considered to be "stateful" since each device maintains information describing the state of the connection (being opened, established, being closed), what data has been sent, and what sent data has been acknowledged.

Some web services require a long period of time (e.g., from several minutes to hours) before being able to respond to client requests. During such a time, it is not practical or efficient to maintain a protocol connection. However, if the connection is broken, then the web service will not be able to provide the response to the client requester.

Thus, there is a need for more efficient communication when providing web services.

DETAILED DESCRIPTION

Client-side endpoint configuration can be accomplished by allowing a client to include as part of a network request (e.g., an API request), a desired endpoint for subsequent notifications from a server. The endpoint can be an endpoint identifier, such as a Uniform Resource Identifier (URI) or a domain name. The URI can be a variety of types of identifiers, such as Uniform Resource Locators (URL) or Uniform Resource Name (URN). The URI can include an IP address/hostname. When a web service receives the API request from a client device, the web service can generate a response to the request and send the response to the endpoint identified in the request. The API request can asynchronously communicate with the client device whenever the response is completed. Particularly, the API request can be received by establishing a first network connection between the client device and a server computer. Rather than maintaining the connection open, the web server can close the connection and continue to work on the API response. Once the response is completed, the server can reconnect with the client device using the endpoint identifier. By reconnecting with the client device, a role reversal can occur, wherein the server behaves like a client and the client behaves like a server. In order to accomplish such a role reversal, a second communication channel can be opened with the server computer initiating the communication. As the server can re-open the connection with the client at a separate point in time, the response is considered asynchronous.

In some embodiments, the client device can send a certificate including a public key so that when the server connects with the client device, it can authenticate the connection.

Figure 1:
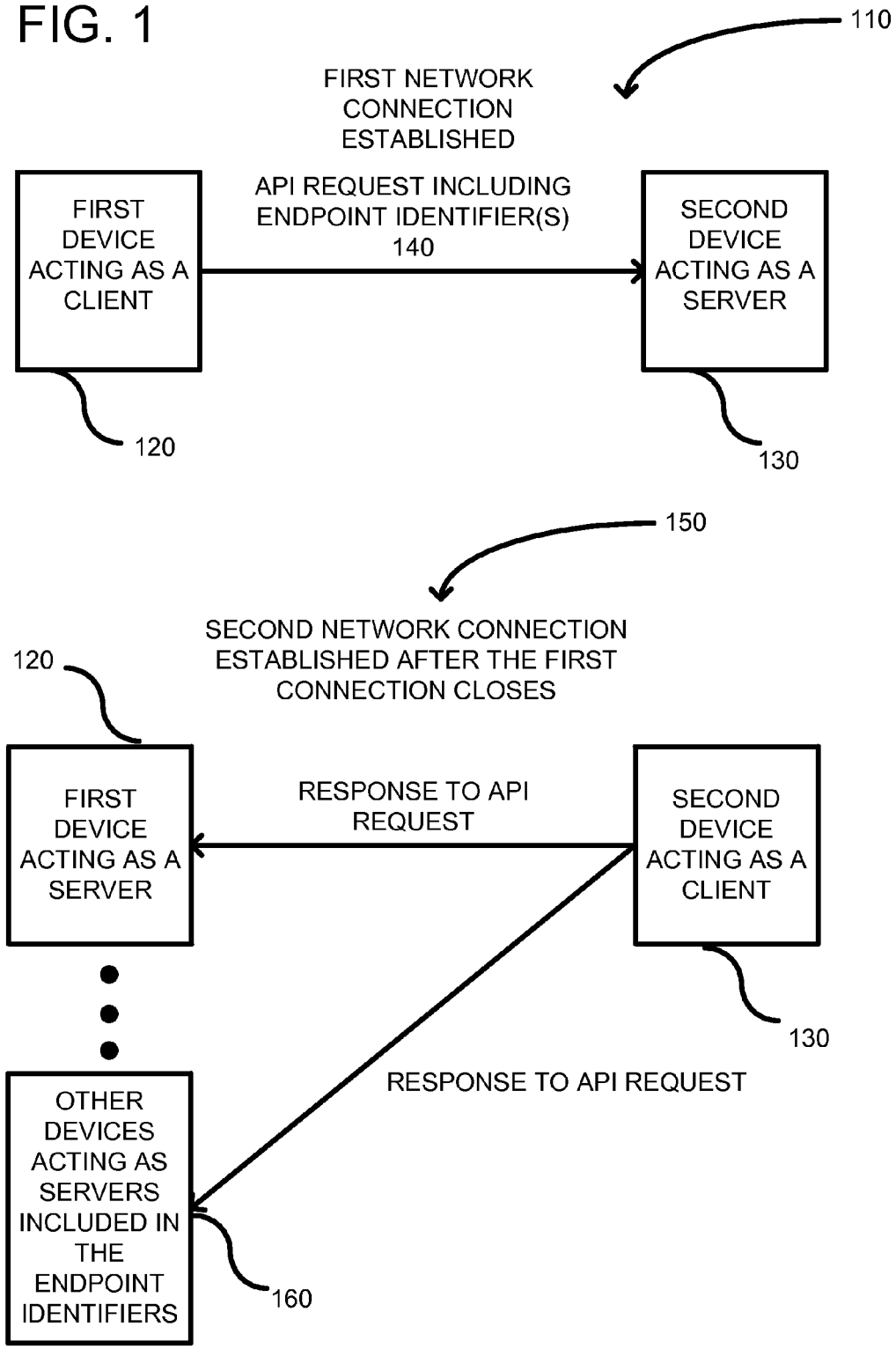
FIG. 1 shows two separate network connections being made in order to receive and then respond to a network request, which in this example is an API request.

FIG. 1 shows two separate network connections being made in order to receive and then respond to an API request. In a first network connection 110, a client device 120 initiates a communication with a server computer 130. Through a series of handshakes, the client device 120 and server computer 130 can open a network connection.

In one embodiment, any desired network protocol can be used, such as TCP/IP, TLS, SSL, etc. Each protocol has its own process steps, but TCP/IP is described further below by way of example. To establish a connection, TCP uses a three-way handshake. Before a client attempts to connect with a server, the server first binds to and listens at a port in what is typically called a passive open. Once the passive open is established, a client may initiate an active open. To establish a connection, the three-way (or 3-step) handshake occurs. For example, the client sends a SYN command to the server. The client sets the segment's sequence number to a random value A. In response, the server replies with a SYN-ACK. The acknowledgment number is set to one more than the received sequence number, i.e. A+1, and the sequence number that the server chooses for the packet is another random number, B. Finally, the client sends an ACK back to the server. The sequence number is set to the received acknowledgement value, i.e., A+1, and the acknowledgement number is set to one more than the received sequence number, i.e., B+1.

At this point, both the client and server have received an acknowledgment of the connection. The first two steps establish the connection parameter (sequence number) for one direction and it is acknowledged. The second and third steps establish the connection parameter (sequence number) for the other direction and it is acknowledged. With these three steps, a full-duplex communication is established. As already stated, other protocols can be used, but typically handshaking back and forth is needed to open a connection.

After the connection is established, the client 120 can send an API request including one or more endpoint identifiers 140 as part of a data transfer portion of the established connection. The endpoint identifiers can be considered to be request parameters. The endpoint identifier can be used to obtain an address of a client device to which the response should be sent. As further described below, the API request can include multiple endpoint identifiers. In some embodiments the multiple endpoint identifiers can be used to send the API response to multiple client devices in parallel. Alternatively, the multiple endpoint identifiers can be used as a failover whereby if a connection cannot be established with a client device, other client devices included in the multiple endpoint identifiers can be used as alternatives. Once the API request is received, the connection can be terminated. The termination of the connection depends on the network protocol being used. For example, with TCP/IP, the connection termination phase uses a four-way handshake, with each side of the connection terminating independently. When an endpoint wishes to stop its half of the connection, it transmits a FIN packet, which the other end acknowledges with an ACK. Therefore, a typical tear-down requires a pair of FIN and ACK segments from each TCP endpoint. After both FIN/ACK exchanges are concluded, the side which sent the first FIN before receiving one waits for a timeout before finally closing the connection, during which time the local port is unavailable for new connections.

After the connection is terminated, the server 130 can continue to generate an API response to the request. Once the response is generated, a second connection can be established at 150. In this case, the first device 120 and the second device 130 switch roles. That is, the second device acts like a client as it initiates communication in order to establish a connection, and the first device acts like a server. The second network connection can be opened through a handshake procedure such as was already discussed above.

Once the second network connection is opened, the response to the API request can be sent to at least the first device 120. Depending on the configuration, the second device 130 can send multiple API responses in parallel to each endpoint included in the API request 140. Thus, any number of devices, shown generically at 160, can receive responses. Alternatively, only one of the other devices 160 can receive a response if the second device 130 is not able to re-establish a connection with the first device 120. Thus, the second device 130 can treat the plurality of endpoint identifiers as a priority-based list to be used in a failover situation, wherein a first endpoint that can be connected to is used as the only endpoint.

In any of the disclosed embodiments, public certificates can be used to provide an added layer of trust that the server is connecting to an authorized client. For example, a public certificate can be issued to the client by a trusted third-party authority or the public certificate can be self-signed. In the self-signed certificate case, the client can create a public/private key pair and generate a certificate including the public key. The client can then digitally sign the certificate with the private key and make the certificate part of the API request to the server. Because the API request itself is signed using the customer's private key, the server has some guarantees that it can trust the certificate. When the server attempts connection to the client, it can use the public key in the certificate to verify that the client is in possession of the private key as part of establishing the connection.

In the embodiment where the endpoint is different than the original client, the private key can be shared with all possible endpoints. Alternatively, the client submitting the request can pass the certificate of the endpoint to the server.

Figure 2:
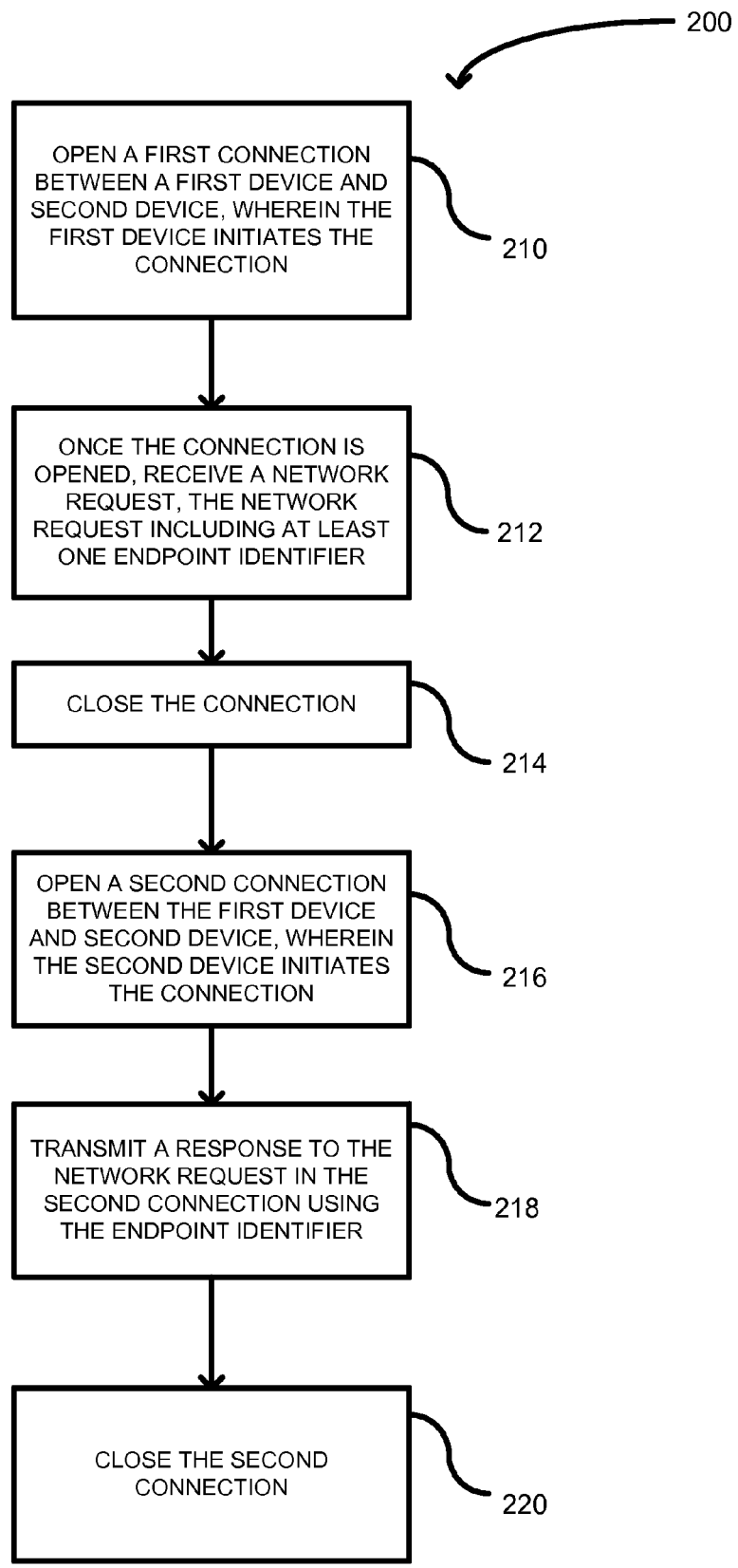
FIG. 2 is a flowchart of a method for making a network request using an endpoint identifier and a response to the network request using the endpoint identifier.

FIG. 2 is a flowchart of a method 200 for making a network request using an endpoint identifier and a response to the network request using the endpoint identifier. In process block 210, a first connection between a first device and second device can be opened. Typically, the first device is a client device and the client device initiates a communication in order to obtain information from a web service. The connection can be opened through a well-established protocol handshake, such as a TCP handshake. In process block 212, once the connection is opened, the client device can transmit a network request, such as an API request. The network request can include at least one endpoint identifier indicating where the response should be sent. The endpoint identifier can be an address or a name (e.g., a domain name) from which an address can be derived or obtained. In process block 214, the web service can close the connection. The web service closes the connection in order to have sufficient time to process the request and generate a response. In some cases, generating the response can take minutes or even hours. Maintaining an open connection in such a situation can be an inefficient use of resources, so the web service can automatically terminate the connection. In other embodiments, the web service can selectively choose whether to maintain the open connection or close it depending on an estimated time period for responding. Nonetheless, assuming the web service has closed the connection, it can open a second connection in process block 216 once it has generated the response. To open the second connection, the web service initiates a request to open a connection using the previously received endpoint. For example, if the endpoint is a URI, then the IP address associated with the URI can be used. If the endpoint is a domain name, then the IP address can be obtained via a DNS server. The endpoint can be associated with the first device or another device identified by the endpoint. It should be understood that the second connection is independent of the first connection. Thus, the first connection can be kept open, if desired, while the second connection is opened so that the two connections are open simultaneously. In process block 218, once the connection is opened, the response to the network request can be transmitted in accordance with the protocol being used. Having completed the response, the second connection can be closed. The device corresponding to the endpoint can initiate the closing of the second connection once it is satisfied with the response.

In process blocks 210 and 212, the first device acts as a client computer and the second device is acting as a server computer. In process blocks 216 and 218, the second device acts like the client device and the first device acts like a server device in terms of the network protocols being used and the initiator of the connection.

Figure 3:
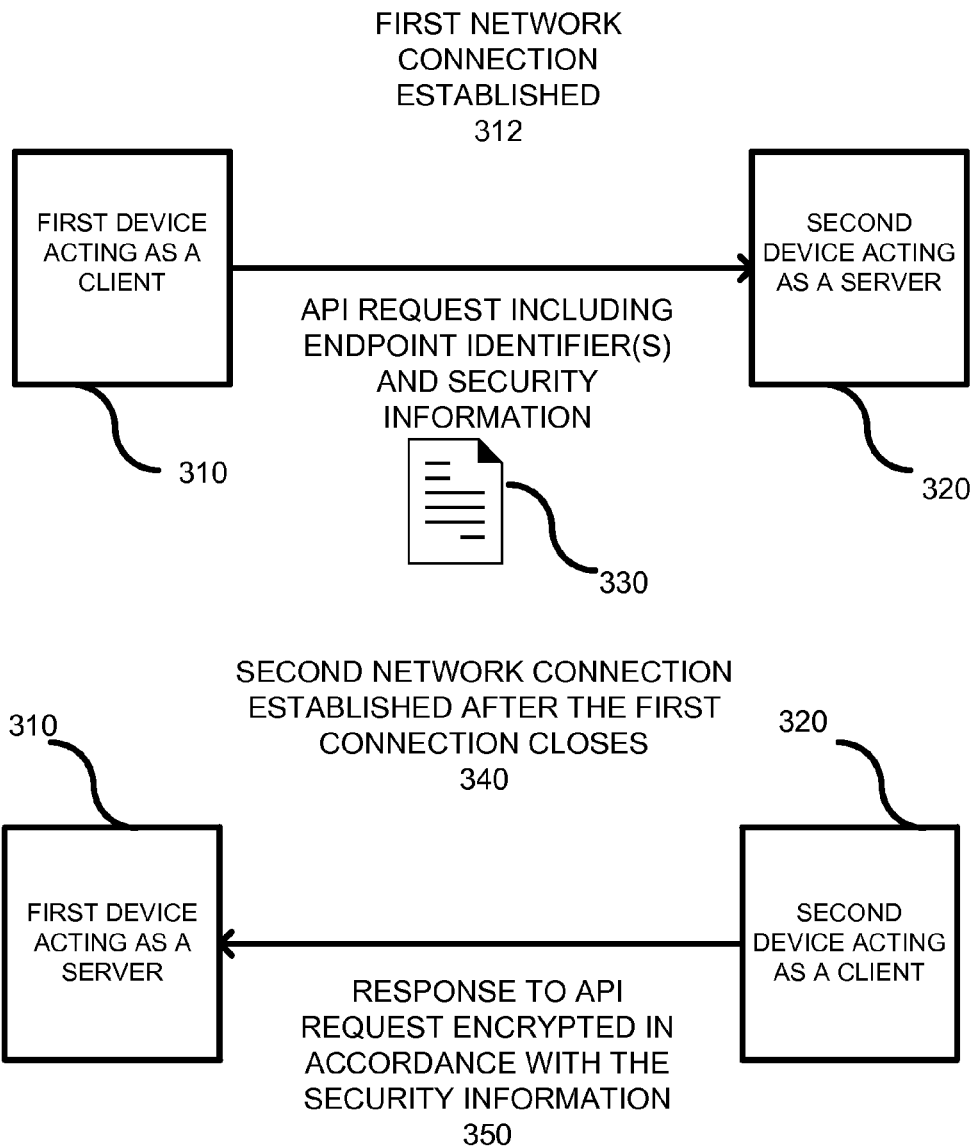
FIG. 3 shows a network request including the endpoint identifier and security information, and a response encrypted in accordance with the security information.

FIG. 3 shows another embodiment wherein a network request includes an endpoint identifier and security information, and a response encrypted in accordance with the security information. Specifically, a first device 310 initiates a first connection 312 and makes an API request using a network protocol to a second device 320. The request can include one or more endpoint identifiers and security information, shown generically at 330. As already described, the endpoint identifiers can include an IP address or a domain name that can be used to obtain the IP address. The security information can be in a variety of forms. For example, the security information can include a public certificate including a public key used to encrypt the response. Alternatively, the security information can include information associated with encryption in conjunction with a customer account identifier. For example, the customer account can have stored encryption information therein, which can be used to encrypt the message. In the simplest example, the security information can be as little as a flag indicating to use security, and the public key is stored in the customer account. Alternatively, the customer account can have multiple keys stored therein and the security information can identify which key to use. In any event, the API request can specify the security information meaning it may include a public key or reference its location or use.

After the first connection closes, a second network connection 340 can be established. The second network connection can be initiated by the second device 320 acting as a client device. Nonetheless, the second device 320 can be a server computer that is typically handling multiple responses from different clients in parallel. The second device 320 can then send a response 350 to the API request that is encrypted in accordance with the security information 330 previously provided. The first device 310 can decrypt the API response and close the connection using process steps associated with the protocol being used.

Figure 4:
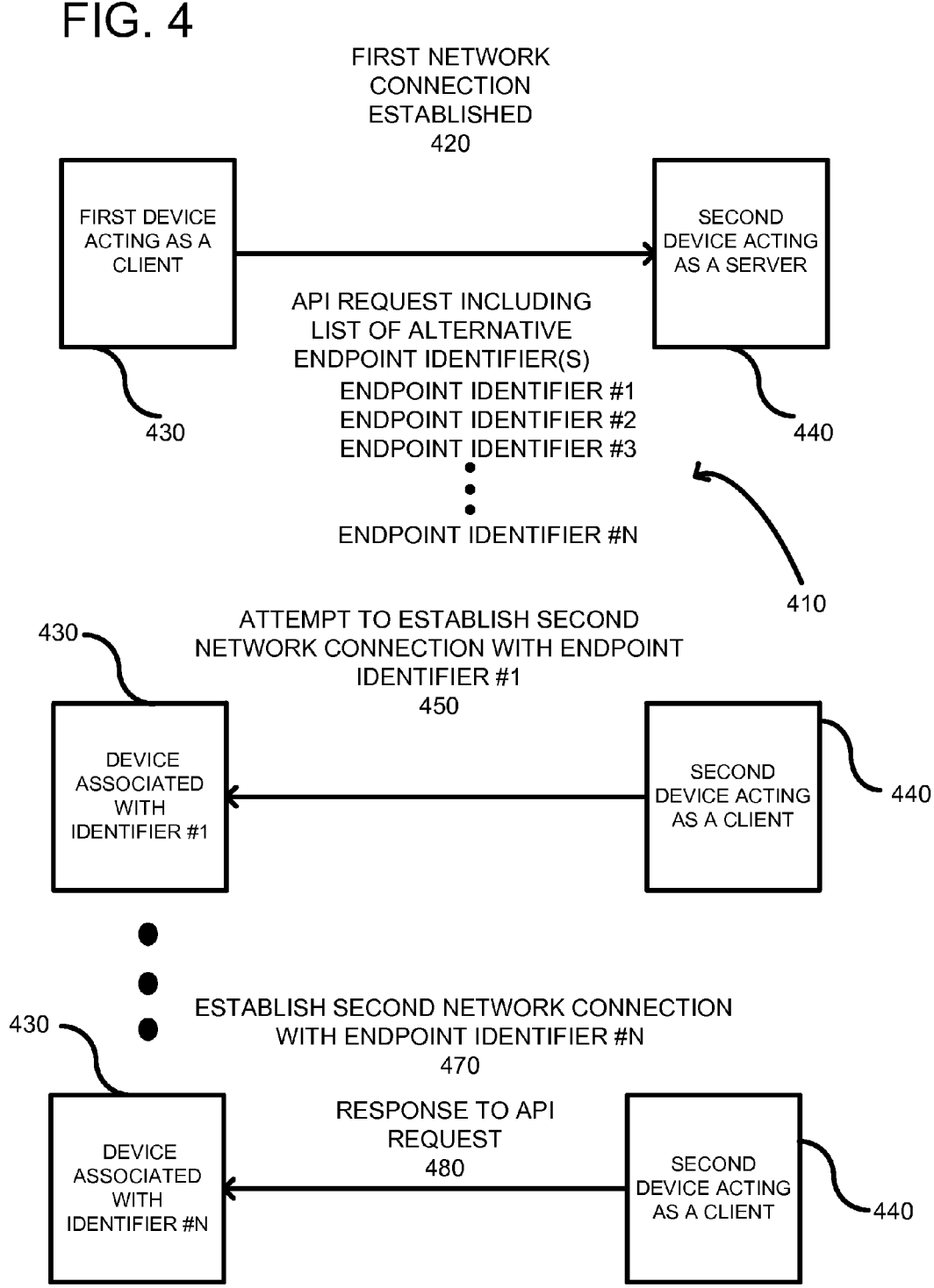
FIG. 4 shows a network request including a list of endpoint identifiers, which is a priority ordered list that can be used as alternative addresses for responding.

FIG. 4 shows a network request including a list of endpoint identifiers 410, which is a priority ordered list that can be used as alternatives. In similar fashion to what was already described above, a first network connection 420 can be opened between a first device 430 acting as a client and a second device 440 acting as a server. A network request can then be made, which can be an API request including the list of N endpoint identifiers 410, where N is any integer value. The first network connection can be terminated and a second network connection 450 can be attempted at any period of time later. In order to open a network connection, the first endpoint from the list 410 is used. If the connection at 450 cannot be established for any reason, then a next endpoint on the priority ordered list 410 can be used. If that endpoint also fails, then a next endpoint on the list is used, and so on until a connection is made. As indicated a second connection 470 is established with endpoint #N. Once the connection is established, a response 480 to the API request can be made to endpoint identifier #N to satisfy the initial request. Once received, the device associated with the endpoint identifier #N can forward the response to one or more of the other endpoints.

Figure 5:
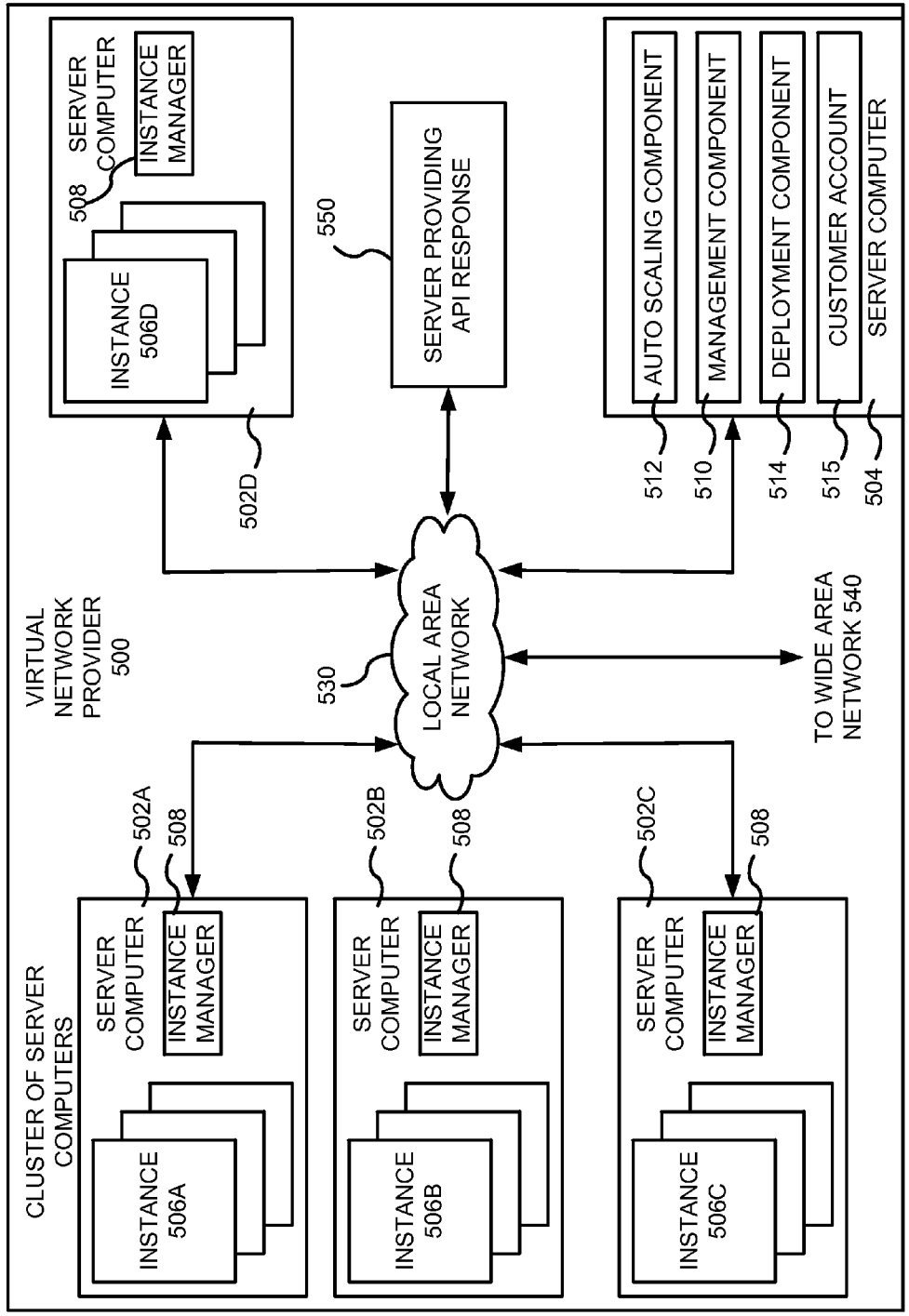
FIG. 5 is an example system diagram showing a plurality of virtual machine instances running in the multi-tenant environment, including a server designed to respond to API requests using an endpoint identifier.

FIG. 5 is a computing system diagram of a network-based virtual network provider 500 that illustrates one environment in which embodiments described herein can be used.

By way of background, the virtual network provider 500 (i.e., the cloud provider) is capable of delivery of computing and storage capacity as a service to a community of end recipients. In an example embodiment, the virtual network provider can be established for an organization by or on behalf of the organization. That is, the virtual network provider 500 may offer a "private cloud environment." In another embodiment, the virtual network provider 500 supports a multi-tenant environment, wherein a plurality of customers operate independently (i.e., a public cloud environment). Generally speaking, the virtual network provider 500 can provide the following models: Infrastructure as a Service ("IaaS"), Platform as a Service ("PaaS"), and/or Software as a Service ("SaaS"). Other models can be provided. For the IaaS model, the virtual network provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the virtual network provider platform without the cost of buying and managing the underlying hardware and software. The SaaS model allows installation and operation of application software in the virtual network provider. In some embodiments, end users access the virtual network provider 500 using networked client devices, such as desktop computers, laptops, tablets, smartphones, etc. running web browsers or other lightweight client applications. Those skilled in the art will recognize that the virtual network provider 500 can be described as a "cloud" environment.

The particular illustrated virtual network provider 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machines. As known in the art, a virtual machine is an instance of a software implementation of a machine (i.e. a computer) that executes applications like a physical machine. In the example of virtual machine, each of the servers 502A-502D can be configured to execute an instance manager 508 capable of executing the instances. The instance manager 508 can be a hypervisor or another type of program configured to enable the execution of multiple instances 506 on a single server. Additionally, each of the instances 506 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A customer can access the management component 510 to configure various aspects of the operation of the instances 506 purchased by the customer.

For example, the customer can purchase, rent or lease instances and make changes to the configuration of the instances. The customer can also specify settings regarding how the purchased instances are to be scaled in response to demand. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514.

Customer account information 515 can include any desired information associated with a customer of the multi-tenant environment. For example, the customer account information can include a unique identifier for a customer, a customer address, billing information, licensing information, customization parameters for launching instances, scheduling information, auto-scaling parameters, etc. As described above, the customer account information 515 can also include security information used in encryption of asynchronous responses to API requests. By "asynchronous" it is meant that the API response can be made at any time after the initial request and with a different network connection.

A network 530 can be utilized to interconnect the server computers 502A-502D and the server computer 504, 550. The network 530 can be a local area network (LAN) and can be connected to a Wide Area Network (WAN) 540 so that end users can access the virtual network provider 500. It should be appreciated that the network topology illustrated in FIG. 5 has been simplified and that many more networks and networking devices can be utilized to interconnect the various computing systems disclosed herein.

A server computer 550 is shown and can be a web server used to deliver web services to a plurality of client computers. The server 550 can be configured to respond to API requests asynchronously and to use the customer account 515 if needed in generation of the response. In one example, generation of the API response can include using security information in the API request coordinated with security information in the customer account. For example, security information regarding how to encrypt the response can be stored in the customer account.

Figure 6:
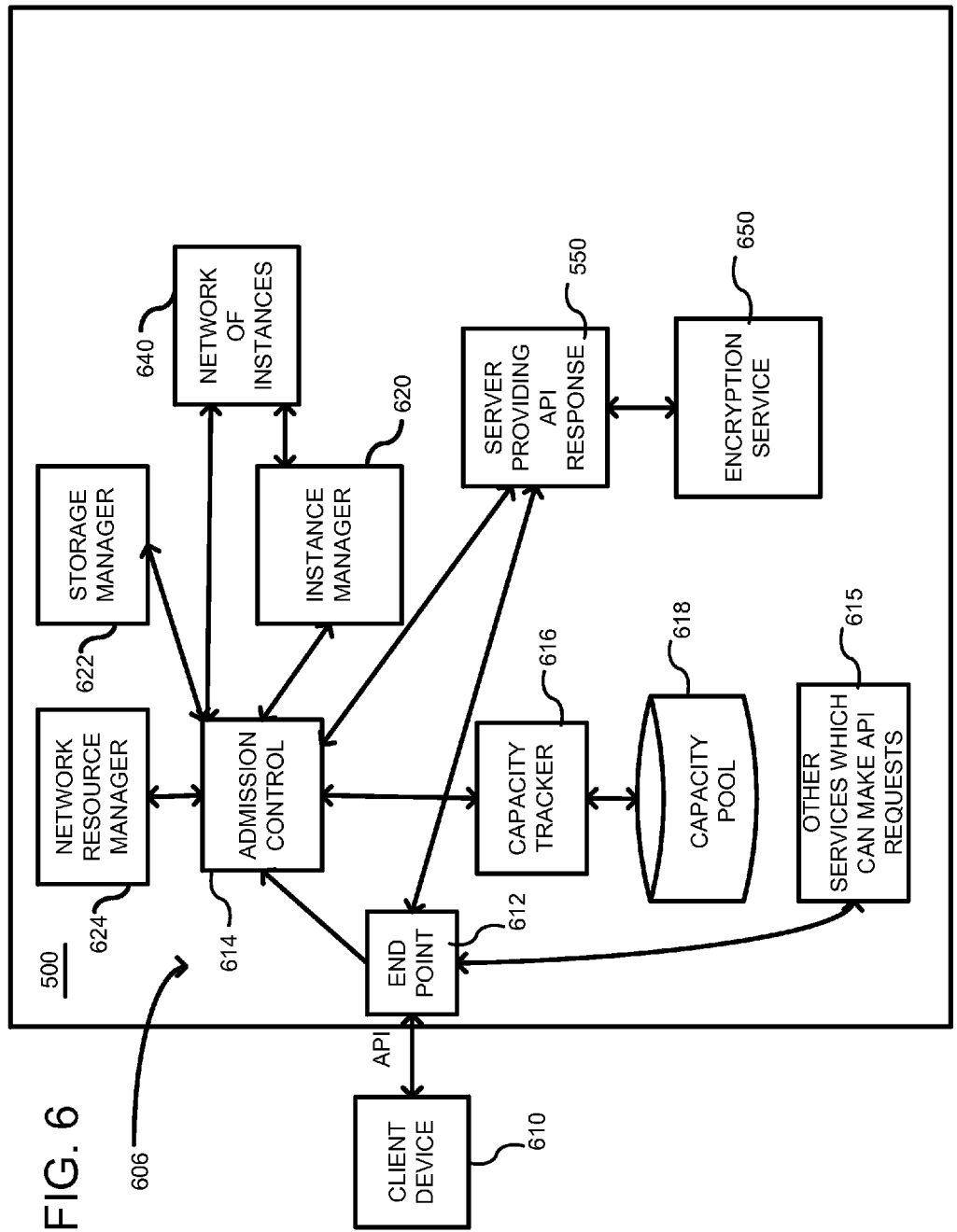
FIG. 6 shows further details of an example system including a plurality of management components associated with a control plane, with a server responding to an API request.

FIG. 6 illustrates in further detail management components 606 that can be used in the multi-tenant environment of the virtual provider network 500. In order to access and utilize instances (such as instances 506 of FIG. 5), a client device can be used. The client device 610 can be any of a variety of computing devices, mobile or otherwise including a cell phone, smartphone, handheld computer, Personal Digital Assistant (PDA), desktop computer, etc. The client device 610 can communicate with the virtual provider network 500 through an end point 612, which can be a DNS address designed to receive and process API requests. In particular, the end point 612 can be a web server configured to expose an API. Using the API requests, a client 610 can make requests to implement any of the functionality described herein. Other services 615, which can be internal to the virtual network provider 500, can likewise make API requests to the end point 612.

Other general management services that may or may not be included in the virtual network provider 500 include an admission control 614, e.g., one or more computers operating together as an admission control web service. The admission control 614 can authenticate, validate and unpack the API requests for service or storage of data within the virtual network provider 500. The capacity tracker 616 is responsible for determining how the servers need to be configured in order to meet the need for the different instance types by managing and configuring physical inventory in terms of forecasting, provisioning and real-time configuration and allocation of capacity. The capacity tracker 616 maintains a pool of available inventory in a capacity pool database 618. The capacity tracker 616 can also monitor capacity levels so as to know whether resources are readily available or limited. The instance manager 620 controls launching and termination of instances in the network. When an instruction is received (such as through an API request) to launch an instance, the instance manager pulls resources from the capacity pool 618 and launches the instance on a decided upon host server computer. Similar to the instance manager are the storage manager 622 and the network resource manager 624. The storage manager 622 relates to initiation and termination of storage volumes, while the network resource manager 624 relates to initiation and termination of routers, switches, subnets, etc. A network of instances 640 includes a physical layer upon which the instances are launched.

The server computer 550 is shown as configured to receive API requests and process the API requests. Once the API request has been processed, an API response is generated. The API requests can be initiated from one or more client devices 610 and/or one or more server computers 615. API requests from server computers 615 can be sent to the server 550 through the endpoint 612. To respond to such requests, the server 550 can call the same endpoint 612, which will route the response to the admission control 614 and then onto the server computer 615. For responding to the client device 610, the server computer can send the response directly to the endpoint provided as a parameter in the original request. In some embodiments, the response can be encrypted, as already described, and encryption can be performed either by the server 550 itself, or by a separate encryption service 650. In order to use the encryption service, the server 550 can generate the appropriate response, send the response to the encryption service 650, and receive back the encrypted response. The encrypted response can then be sent to the client device 610.

Figure 7:
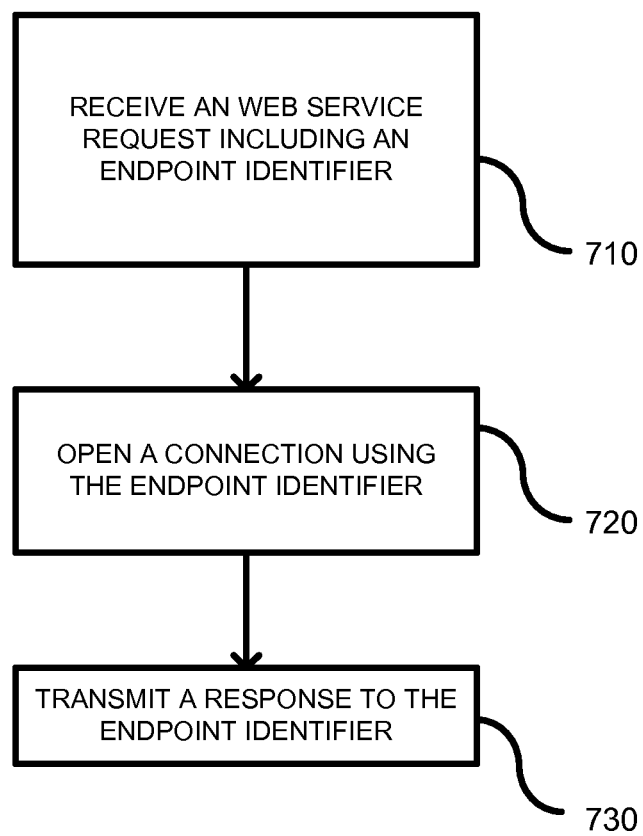
FIG. 7 is a flowchart of a method of receiving and responding to a network request from the perspective of a web server.

FIG. 7 is a flowchart of a method of receiving and responding to a network request from the perspective of a web server. In process block 710, a network request including an endpoint identifier can be received. The endpoint identifier can be a single endpoint identifier including a URI or domain name. Alternatively, the endpoint identifier can include two or more endpoint identifiers, wherein each endpoint identifier receives a copy of the API response in parallel. In other embodiments, a list of endpoint identifiers can be received, wherein the list is priority ordered so that each endpoint identifier is attempted in turn until a connection is established with one of the devices associated with the endpoint. When the request is received, the sender is considered a client device, and the recipient is considered a server computer. In process block 720, a connection can be opened using the endpoint identifier. Thus, an endpoint previously received in an API request can be used to re-establish a second connection and a response to the API request. In process block 730, a response to the API request can be transmitted after the second connection is opened. When the response is transmitted, the sender is playing the role of a client device and the receiver is playing the role of a server device, which is the opposite of how each device was configured in process block 710.

Figure 8:
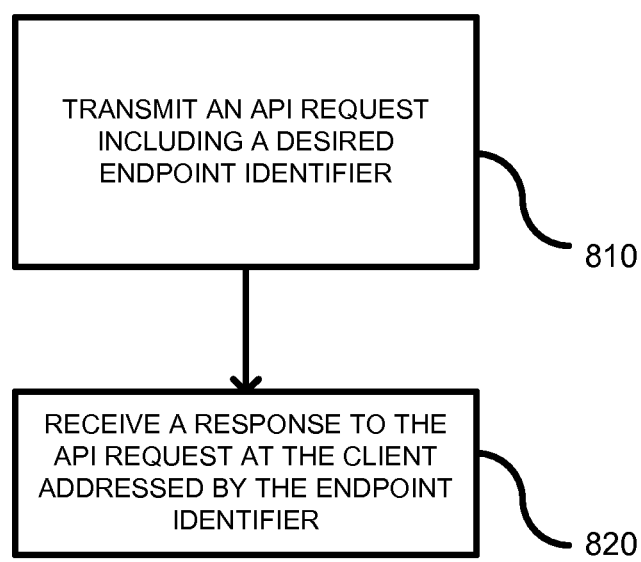
FIG. 8 is a flowchart of a method of transmitting and receiving a response to a network request from the perspective of a client device.

FIG. 8 is a flowchart of a method of transmitting and receiving a response to a network request from the perspective of a client device. In process block 810, a client device transmits an API request to a web server including a desired endpoint identifier. The endpoint identifier represents a desired endpoint to which a response should be transmitted. As described previously, the request can also include a plurality of endpoint identifiers for redundancy and/or failover. In process block 820, a response can be received to the API request. The response is received at the endpoint associated with the endpoint identifier. The device receiving the response can be different than the device that transmitted the request in process block 810.

Figure 9:
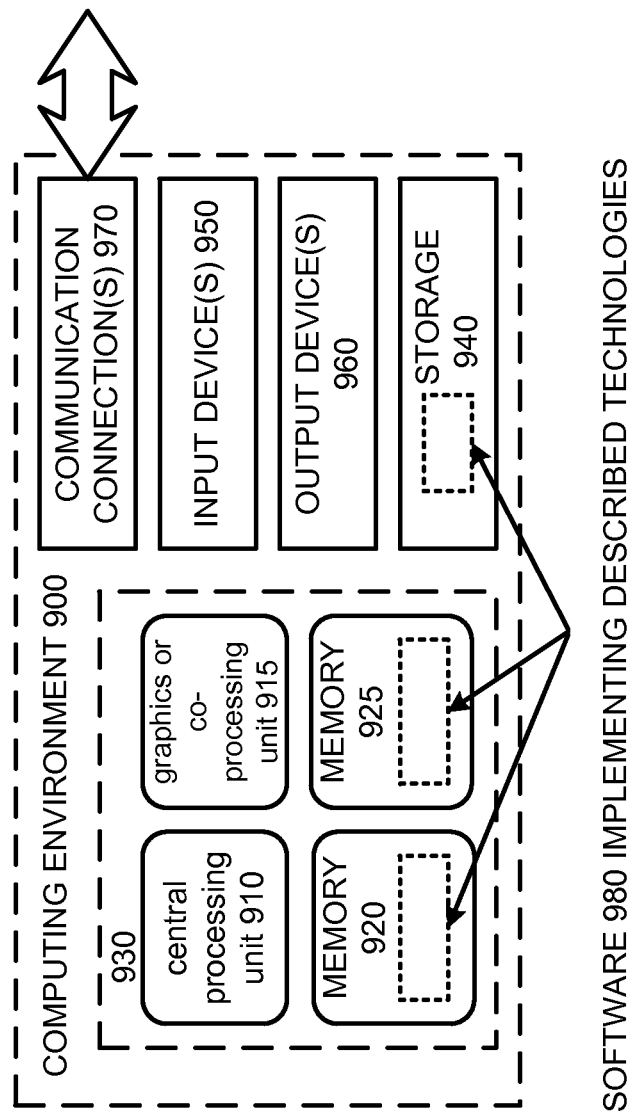
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.)

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein. For example, software designed to respond asynchronously to API requests can be executed from memory 920.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of communicating with a web service, comprising:
    opening a first connection between a first device, acting as a client device, and a second device, acting as a server device;
    receiving an Application Programming Interface ("API") request from the first device, the API request including multiple endpoint identifiers as parameters with the API request indicating where a response to the API request should be sent, wherein the multiple endpoint identifiers include a list of alternative endpoint identifiers in a priority order to use for sending a response to the request to any one of a plurality of devices, including the first device, associated with the endpoint identifiers, wherein a next alternative endpoint identifier on the list is used when a connection cannot be established;
    closing the first connection between the first device and the second device;
    opening a second connection between the second device, acting as a client device, and at least one of the plurality of devices acting as a server device, wherein the opening of the second connection includes using the list of alternative endpoint identifiers in the priority order to establish a connection with the at least one of the plurality of devices;
    transmitting the response to the API request over the second connection, so that the API request and response are received and transmitted, respectively, over different connections; and
    closing the second connection between the first device and the second device.

2. The method of claim 1, wherein the multiple endpoint identifiers include uniform resource identifiers and wherein closing the first connection occurs before or after the opening of the second connection.

3. The method of claim 1, wherein the API request includes security information and wherein the response to the API request is encrypted using the security information.

4. The method of claim 3, wherein the security information includes a public certificate.

5. A non-transitory computer-readable storage, which is non-volatile, having instructions thereon for executing a method, the method comprising:
    receiving a web service Application Programming Interface (API) request including one or more request parameters over a first connection wherein a server computer receives the web service API request from a client device, wherein one of the request parameters includes a list of alternative endpoint identifiers, which identifies a plurality of devices to which a response to the web service API request can be sent, wherein the list of alternative endpoint identifiers is for indicating a priority order of devices with which a connection is attempted;
    closing the first connection;
    opening a second connection, from the server computer acting as a client device, with at least one of the plurality of devices acting as a server device, using the list of alternative endpoint identifiers by attempting to establish a connection with each of the plurality of devices, in turn, and in a priority order indicated by the list, until the connection is established with at least one of the plurality of devices; and
    transmitting a response associated with the web service request over the established connection.

6. The computer-readable storage of claim 5, wherein the endpoint identifiers include one or more of the following: a uniform resource identifier or a domain name.

7. The computer-readable storage of claim 5, further including opening two connections between the server computer and the device with which the second connection is opened, wherein, a first of the two connections for receiving the web service API request, and a second of the two connections, which is opened after the first connection is closed, for transmitting the response.

8. The computer-readable storage of claim 7, wherein the device is a client device and the server computer is a server device during the first of the two connections, and the server computer is a client device and the device is a server device during the second of the two connections.

9. The computer-readable storage of claim 5, wherein the web service API request further includes security information used for encrypting the response.

10. The computer-readable storage of claim 5, wherein the endpoint identifier is a domain name or a uniform resource identifier.

11. The computer-readable storage of claim 5, further including:
opening a first connection in order to receive the web service API request;
closing the first connection after the web service API request is received; and
opening the second connection after the first connection is closed in order to transmit the response.

12. The computer-readable storage of claim 11, wherein opening the first connection and opening the second connection includes establishing the connection using an Internet protocol through multiple handshakes.

13. The computer-readable storage of claim 5, wherein the connection is established using a first endpoint identifier and wherein the web service API request includes at least a second endpoint identifier, different than the first endpoint identifier, and wherein opening the second connection includes establishing connections with at least two of the plurality of devices in parallel.

14. A system for receiving an Application Programming Interface ("API") request, comprising:
an authentication service, executing on at least one host server computer, for receiving an API request from a first client device specifying multiple endpoint identifiers, security information, and a customer identification, wherein the API request is received on a first communication channel that is closed after receipt of the API request, wherein the multiple endpoint identifiers include a list of alternative endpoint identifiers for indicating a priority order of devices with which a connection is attempted when transmitting a response to the API request;
storage for a customer account corresponding to the customer identification; and
a web server for generating a response to the API request and for establishing a second communication channel using the list of alternative endpoint identifiers in a priority order indicated by the list, until the second communication channel is opened, wherein the response is encrypted in accordance with the security information and wherein the web server takes a role of a second client device and the first client device takes the role of a server computer.

15. The system of claim 14, further including an encryption server coupled to the web server for encrypting the response.

* * * * *